United States Patent
Herley

(10) Patent No.: US 7,623,734 B2
(45) Date of Patent: Nov. 24, 2009

(54) METHOD AND SYSTEM FOR AUTOMATICALLY INSCRIBING NOISY OBJECTS IN SCANNED IMAGE DATA WITHIN A MINIMUM AREA RECTANGLE

(75) Inventor: Cormac E. Herley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 810 days.

(21) Appl. No.: 10/956,225

(22) Filed: Sep. 30, 2004

(65) Prior Publication Data
US 2006/0072818 A1 Apr. 6, 2006

(51) Int. Cl.
G06K 9/36 (2006.01)
G06K 9/34 (2006.01)
G06K 9/40 (2006.01)
G09G 5/00 (2006.01)
G06T 11/20 (2006.01)

(52) U.S. Cl. .................. 382/286; 382/173; 382/269; 382/282; 382/291; 345/619; 345/629; 345/441

(58) Field of Classification Search .................. 382/100, 382/135, 173–174, 254, 266, 269, 282, 289, 382/286, 291; 345/418–421, 428, 581, 619, 345/621, 622, 625, 628, 666, 173–174, 269, 345/629, 441
See application file for complete search history.

(56) References Cited

U.S. PATENT DOCUMENTS

| 4,674,058 A | * | 6/1987 | Lindbloom et al. | ......... 345/441 |
| 4,771,469 A | * | 9/1988 | Wittenburg | ................. 382/203 |
| 4,802,230 A | * | 1/1989 | Horowitz | .................... 382/199 |
| 4,989,257 A | * | 1/1991 | Horowitz | .................... 382/192 |
| 5,519,818 A | * | 5/1996 | Peterson | .................... 345/642 |
| 5,801,966 A | * | 9/1998 | Ohashi | ....................... 702/152 |
| 5,892,854 A | * | 4/1999 | de Queiroz et al. | ......... 382/288 |
| 6,049,636 A | * | 4/2000 | Yang | .......................... 382/289 |
| 6,262,734 B1 | * | 7/2001 | Ishikawa | .................... 715/850 |

(Continued)

OTHER PUBLICATIONS

DePano, Adlai et al.. "Minimum Enclosing Rectangles: A Comparative Investigation of Two Optimizing Criteria (reprise)", Southeastcon '91., IEEE Proceedings of. Apr. 7-10, 1991.*

(Continued)

Primary Examiner—Bhavesh M Mehta
Assistant Examiner—Gandhi Thirugnanam
(74) Attorney, Agent, or Firm—Lyon & Harr, L.L.P.; Craig S. Fischer

(57) ABSTRACT

A minimum area rectangle inscription method and system for automatically generating a minimum area rectangle that inscribes and bounds an approximately rectangular object (or "noisy" object) contained within scanned image data. The minimum area rectangle inscription method chooses an interior point located inside the object boundary and determine perimeter points located on the boundary. A convex hull is constructed from at least some of the perimeter points such that each side of the convex hull is convex. Inscribing rectangles, equal in number to the sides of the convex hull, are constructed such that each inscribing rectangle shares a side with the convex hull and circumscribes approximately the entire convex hull. The area of each of the inscribing rectangles is calculated, and the inscribing rectangle having the least amount of area is designated as the minimum area rectangle.

23 Claims, 16 Drawing Sheets

U.S. PATENT DOCUMENTS

| | | | | |
|---|---|---|---|---|
| 6,373,489 | B1* | 4/2002 | Lu et al. | 345/428 |
| 6,373,590 | B1* | 4/2002 | Ancin et al. | 358/1.18 |
| 6,489,955 | B1* | 12/2002 | Newhall, Jr. | 345/419 |
| 6,771,841 | B1* | 8/2004 | O'Rourke et al. | 382/288 |
| 7,002,572 | B1* | 2/2006 | Teig et al. | 345/420 |
| 7,080,065 | B1* | 7/2006 | Kothuri et al. | 707/3 |
| 7,162,084 | B2* | 1/2007 | Herley | 382/173 |
| 7,274,365 | B1* | 9/2007 | Dunn | 345/426 |
| 7,317,829 | B2* | 1/2008 | Herley | 382/171 |
| 7,324,691 | B2* | 1/2008 | Li et al. | 382/181 |
| 2002/0171665 | A1* | 11/2002 | Ramani et al. | 345/611 |
| 2004/0119986 | A1* | 6/2004 | Benke et al. | 356/614 |
| 2005/0063592 | A1* | 3/2005 | Li et al. | 382/181 |
| 2005/0117033 | A1* | 6/2005 | Matsui | 348/239 |
| 2006/0158632 | A1* | 7/2006 | Yasuda et al. | 355/55 |
| 2006/0245633 | A1* | 11/2006 | Yamada | 382/141 |

OTHER PUBLICATIONS http://cgm.cs.mcgill.ca/~orm/rotcal.html "Rotating Calipers—> The minimum area enclosing rectangle for a convex polygon" Dec. 17, 1998.*

Godfried T. Toussaint, "Solving geometric problems with the rotating calipers," Proceedings of IEEE MELECON'83, Athens, Greece, May 1983.*

Herley, Cormac. "Efficient inscribing of noisy rectangular objects in scanned images", Image Processing, 2004. ICIP '04. 2004 International Conference on. Oct. 2004.* http://www-lmr.usc.edu/~requicha/ch7.pdf, "Geometric Modeling: A First Course" May 10, 1999.*

Freeman H. et al. "Determining the Minimum-Area Encasing Rectangle for an Arbitrary Closed Curve", Communications of the ACM, vol. 18 No. 7, Jul. 1975.*

Carr J. et al. "3D Shape Reconstruction using Volume Intersection Techniques", p. 1095-1100, Sixth International Conference on Computer Vision (ICCV'98), 1998.*

"Regular Polygon Formulas", http://mathforum.org/dr.math/faq/formulas/faq.regpoly.html, Feb. 2, 2002.*

Liu, Yun-Hui, "Computing n-Finger Form-Closure Grasps on Polygonal Objects", Feb. 2000, The International Journal of Robotics Research, vol. 19, No. 2 pp. 149-158.*

Ulrich, O. et al., "Approximation of Convex Figures by Pairs of Rectangles", 1990, Symposium on Theoretical Aspects of Computer Science.*

Becker, Bruno et al. "An optimal algorithm for approximating a set of rectangles by two minimum area rectangles", 1991, Computational Geometry-Methods, Algorithms and Applications, pp. 13-25.*

Co-pending U.S. Appl. No. 10/354,500, "System and Method for Automatically Detecting and Extracting Objects in Digital Image Data", filed Jan. 29, 2003.

Co-pending U.S. Appl. No. 10/734,516, "Background Color Estimation for Scanned Images", filed Dec. 12, 2003.

* cited by examiner

METHOD AND SYSTEM FOR AUTOMATICALLY INSCRIBING NOISY OBJECTS IN SCANNED IMAGE DATA WITHIN A MINIMUM AREA RECTANGLE

TECHNICAL FIELD

The present invention relates in general to image processing of digital image data and more particularly to a minimum area rectangle inscription system and method for automatically generating a minimum area rectangle that inscribes and bounds an approximately rectangular object (or "noisy" object) contained within scanned image data.

BACKGROUND OF THE INVENTION

Optical scanners are popular and useful peripheral devices for computers. Optical scanners are used to take objects containing printed information (such as text, illustrations or photographs) and convert the information into a digital form that a computer can use. In general, a user places objects to be scanned onto a platen of the scanner. A scanner head is passed over the platen area and the resultant image is divided into a plurality of pixels. Each pixel location is assigned a value that is dependent on the color of the pixel. The resulting matrix of bits (called a bit map) can then be stored in a file, displayed on a monitor, and manipulated by software applications. The resulting scanned image contains both data pixels, which are pixels that are located on the objects, and background pixels, which are pixels that are the color of the background. Typically, the background color is the color of the lid of the scanner.

In order to automate the segmentation process, an automatic detection and extraction technique may be used to detect and extract multiple objects in scanned images. One such technique is described in U.S. Ser. No. 10/354,500 by Herley entitled "System and method for automatically detecting and extracting objects in digital image data" filed on Jan. 29, 2003. This particular object detection and extraction technique searches for gaps in the histograms of rows and columns of a scanned image containing multiple objects. A gap means that there are no data pixels going across that row or column of the image. These gaps are found by classifying pixels as either data pixels or background pixels and repeatedly decomposing the image into a case with a single object and a background. Once the decomposition is complete, the single object case can easily be solved. Gaps are determined by taking profiles of a histogram. A data pixel is defined as a pixel that differs by at least a threshold from the background color.

Any detection and extraction technique needs to define a rectangle that bounds the object in the scanned image data in order to be able to extract that object. When the object in the scanned image data is perfectly rectangular and contains neat edges and corners, the detection and extraction techniques work extremely well. However, detection and extraction becomes markedly more difficult when the object is crumpled, torn, folded, creased or otherwise deformed. Such "noisy" objects are no longer perfectly rectangular and lack well-defined edges and corners. By way of example, this can occur when objects such as receipts are placed in a wallet, purse, or pocket, leading to creasing, tearing, or both. As another example, torn sheets of paper or scraps of paper may be contained in the scanned image data. Because detection and segmentation techniques typically search for edges or corners of objects, noisy objects can lead to errors and inaccuracies.

As stated above, one way to define a rectangle around each object is to have a user to manually select the boundaries of each object. However, process of manually segregating each object within the scanned image is a laborious task. It would be convenient and desirable to automatically find rectangles that bound objects within scanned image data rather than requiring a user to do so. Therefore, what is needed is a simple, efficient, robust and accurate system and method for automatically finding a rectangle that bounds one or more noisy objects in scanned image data.

SUMMARY OF THE INVENTION

The invention disclosed herein includes a minimum area rectangle inscription method and system for automatically finding a minimum area rectangle that circumscribes a noisy object in scanned image data. The method and system are simple and efficient and can accurately and robustly determine a minimum area rectangle that inscribes a noisy object located in scanned image data. The minimum area rectangle inscription method and system alleviates the need for a user to manually draw bounding rectangles around a noisy object. Moreover, the minimum area rectangle inscription method and system aids any detection and extraction technique by providing such a technique with an accurate bounding rectangle for each object in scanned image data.

The minimum area rectangle inscription method includes automatically finding a minimum area rectangle that inscribes an object. A convex hull is constructed from perimeter points located on a boundary of the object. Each of the perimeter points is obtained by choosing an interior point. The interior point may be chosen randomly or by finding the center of mass of the object and defining that as the interior point. The perimeter points are found using the interior point by sending a ray in a straight line outward from the interior point in different directions. A perimeter point is defined where the ray intersects the boundary. The number of perimeter points desired is selected, and the rays can be evenly spaced or randomly spaced to obtain the desired number of perimeter points.

The convex hull is constructed by using at least some of the perimeter points. The selected perimeter points are used to construct the convex hull by connecting the selected perimeter points with line segments. Thus, if the number of selected perimeter point is M, the convex hull has M number of sides. It should be noted that in general a "side" is a line segment between two perimeter points.

Inscribing rectangles then are generated for the convex hull. The number of inscribing rectangles is equal to M. Each inscribing rectangle must meet two criteria. First, the inscribing rectangle shares at least one side with the convex hull. Second, the inscribing rectangle encompasses or circumscribes the whole of the convex hull. The area of each inscribing rectangle then is calculated. The inscribing rectangle having the least amount of area is the minimum area rectangle.

In an alternate embodiment, multiple interior points are chosen, and perimeter points are obtained corresponding to each of the interior points. In another embodiment, a convex hull is made for each set of perimeter points from the interior points, and minimum area rectangles are obtained from each convex hull. These rectangles are compared, and the one having the absolute least area is selected as the minimum area rectangle. This embodiment verifies the accuracy of the method by determining whether the minimum area rectangles obtained from different convex hulls have approximately similar areas. In still another embodiment, a single convex hull is generated from the perimeter points of the multiple interior points. From this single convex hull, a minimum area rectangle is obtained. This embodiment is useful is certain situations where a significant portion of the center of the object may be missing.

BRIEF DESCRIPTION OF THE DRAWINGS

The present invention can be further understood by reference to the following description and attached drawings that illustrate aspects of the invention. Other features and advantages will be apparent from the following detailed description of the invention, taken in conjunction with the accompanying drawings, which illustrate, by way of example, the principles of the present invention.

Referring now to the drawings in which like reference numbers represent corresponding parts throughout.

DETAILED DESCRIPTION OF THE INVENTION

In the following description of the invention, reference is made to the accompanying drawings, which form a part thereof, and in which is shown by way of illustration a specific example whereby the invention may be practiced. It is to be understood that other embodiments may be utilized and structural changes may be made without departing from the scope of the present invention.

I. Introduction

Often it is desirable to scan a plurality of small documents or objects (such as receipts) and save them as separate and individual files. However, this can be a particularly laborious task for a user, since current techniques require the user to manually draw a bounding rectangle around each object before the object can be detected and extracted. This process of manually drawing bounding rectangles is even more difficult when the objects are "noisy". Noisy objects are only approximately rectangular because the object has been folded, torn, or otherwise deformed.

The minimum area rectangle inscription method and system described herein automatically finds a bounding or inscribing rectangle around noisy objects rather than requiring a user to do so. The inscribing rectangle is a minimum area rectangle, such that the amount of image data (or pixels on the object) located within the rectangle are maximized and the amount of background data (or pixels located off the object) is minimized.

The minimum area rectangle inscription method and system scales well as the resolution of the scanned image data increases. For example, as image data goes from 300 dots per inch (dpi) to 600 dpi, the size of the image file quadruples. This means the size of a file at 600 dpi is four times as big as the file size of a 300 dpi image. In many image processing algorithms, the complexity and time to process of the algorithm also quadruples. However, the minimum area rectangle method and system grows at a slower rate than the number of pixels in the image. In addition, the method and system are extremely accurate and robust. For example, when choosing interior points, nearly any point within the object may be used, without any significant degradation of accuracy.

II. General Overview

Figure 1:
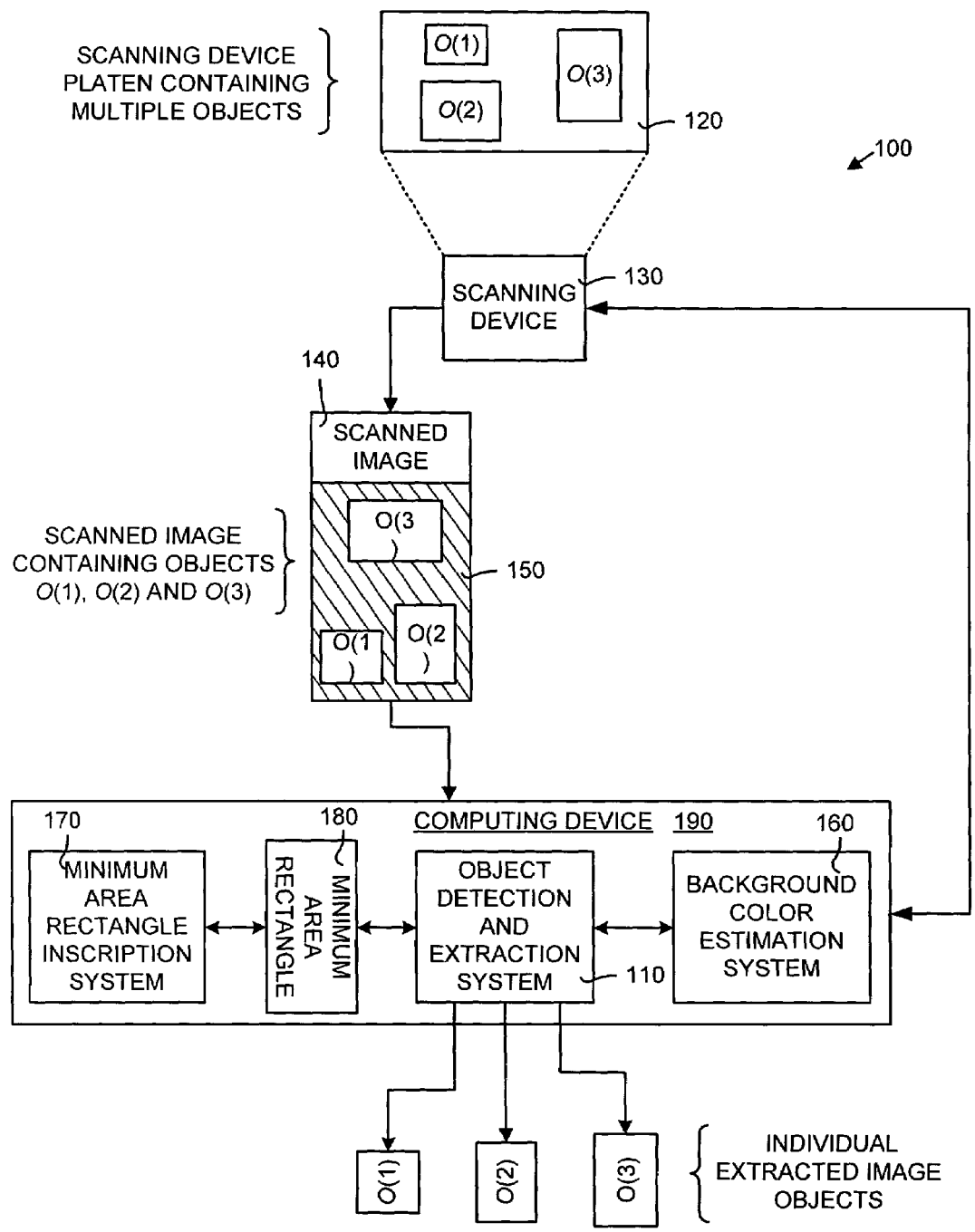
FIG. 1 is a block diagram illustrating an exemplary implementation of the minimum area rectangle inscription system and method disclosed herein incorporated into an image processing system.

FIG. 1 is a block diagram illustrating an exemplary implementation of the minimum area rectangle inscription system and method disclosed herein incorporated into an image processing system. It should be noted that FIG. 1 is merely one of several ways in which the inscription system and method may implemented and used. In the exemplary implementation shown in FIG. 1, the minimum area rectangle inscription system and method is shown implemented into an image processing system 100 that includes an object detection and extraction system 110. One example of this object detection and extraction system is described in U.S. Ser. No. 10/354, 500 by Herley entitled "System and method for automatically detecting and extracting objects in digital image data" filed on Jan. 29, 2003.

In general, digital image data is processed by the object detection and extraction system 110 to determine the number of objects and the size, orientation and position of each object contained in the digital image data. The system 110 achieves this by determining the boundaries of each object and automatically segregating the objects into separate image objects. This spares the user the time and effort of performing manual segregation of each object.

More specifically, as shown in FIG. 1, a user places multiple objects (such as photographs or receipts), O(1), O(2) and O(3), on a platen 120 of a scanning device 130 (such as a flatbed scanner). The dashed lines shown in FIG. 1 are to represent that the platen 120 is contained on the scanning device 130. These objects O(1), O(2) and O(3) may be noisy objects such that they are deformed a perfectly rectangular shape. The user then scans the objects positioned on the platen 120 and a scanned image 140 is obtained. The scanned image 140 is a single digital image containing each of the objects (O(1), O(2) and O(3)) as well as background data 150. The background data, which is shown in FIG. 1 by the hatched lines, typically represents color of a lid (not shown) of the scanning device 130. This lid typically covers the platen 120 during the scanning process.

In order for the object detection and extraction system 110 to accurately detect and extract the objects (O(1), O(2) and O(3)) from the scanned image 140, the color of the background must be accurately estimated. A background color estimation system 160 may be is used to accurately estimate the background color. One example of this background color estimation system 160 is described in U.S. Ser. No. 10/734,516 by Herley entitled "Background Color Estimation for Scanned Images" filed on Dec. 12, 2003.

Another requirement for the object detection and extraction system 110 to accurately detect and extract the objects (O(1), O(2) and O(3)) from the scanned image 140 is that bounding rectangles must be found for each of the objects. A minimum area rectangle inscription system 170 as disclosed herein is used to generate a minimum area rectangle that inscribes and bounds the objects. This is true even if the objects are noisy objects. The scanned image data containing the objects (O(1), O(2) and O(3)) is processed by the minimum area rectangle system 170 to output a minimum area rectangle 180 for each object. These bounding rectangles are used by the object detection and extraction system 110 to accurately detect and extract the objects from the scanned image data.

The object detection and extraction system 110, the background color estimation system 160, and the minimum area rectangle inscription system 170 are located on a computing device 190 (although not necessarily on the same computing device). The computing environment in which the minimum area rectangle inscription system 170 operates will now be discussed.

III. Exemplary Operating Environment

The minimum area rectangle inscription system 170 and method disclosed herein are designed to operate in a computing environment. The following discussion is intended to provide a brief, general description of a suitable computing environment in which the minimum area rectangle inscription system and method may be implemented.

Figure 2:
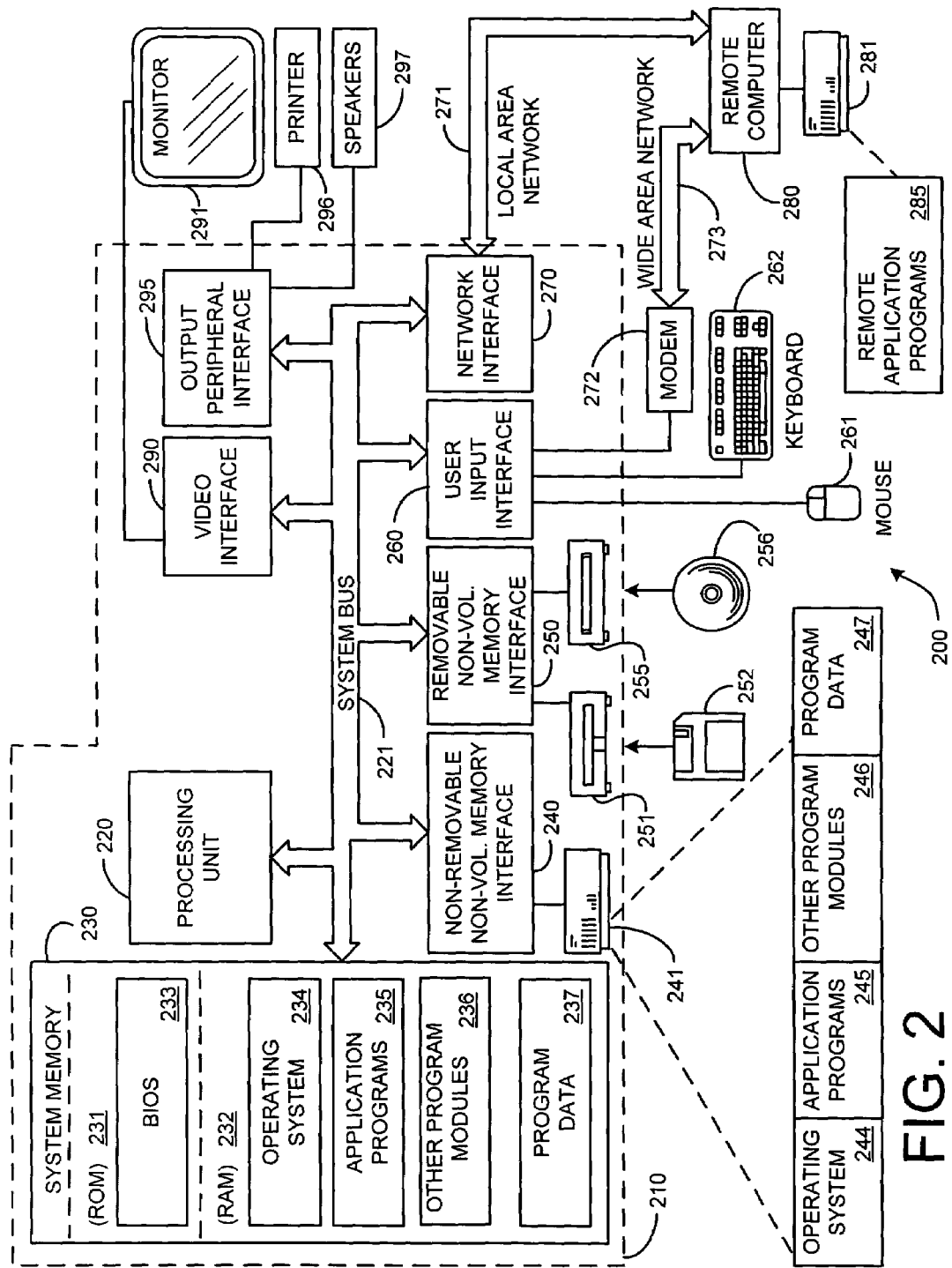
FIG. 2 illustrates an example of a suitable computing system environment in which the minimum area rectangle inscription system and method shown in FIG. 1 may be implemented.

FIG. 2 illustrates an example of a suitable computing system environment in which the minimum area rectangle inscription system and method shown in FIG. 1 may be implemented. The computing system environment 200 is only one example of a suitable computing environment and is not intended to suggest any limitation as to the scope of use or functionality of the invention. Neither should the computing environment 200 be interpreted as having any dependency or requirement relating to any one or combination of components illustrated in the exemplary operating environment 200.

The minimum area rectangle inscription system and method is operational with numerous other general purpose or special purpose computing system environments or configurations. Examples of well known computing systems, environments, and/or configurations that may be suitable for use with the background color estimation system and method include, but are not limited to, personal computers, server computers, hand-held, laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

The minimum area rectangle inscription system and method may be described in the general context of computer-executable instructions, such as program modules, being executed by a computer. Generally, program modules include routines, programs, objects, components, data structures, etc., that perform particular tasks or implement particular abstract data types. The minimum area rectangle inscription system and method may also be practiced in distributed computing environments where tasks are performed by remote processing devices that are linked through a communications network. In a distributed computing environment, program modules may be located in both local and remote computer storage media including memory storage devices. With reference to FIG. 2, an exemplary system for implementing the minimum area rectangle inscription system and method includes a general-purpose computing device in the form of a computer 210 (the computing device 190 shown in FIG. 1 is a specific embodiment of the computer 210).

Components of the computer 210 may include, but are not limited to, a processing unit 220, a system memory 230, and a system bus 221 that couples various system components including the system memory to the processing unit 220. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 210 typically includes a variety of computer readable media. Computer readable media can be any available media that can be accessed by the computer 210 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 210. Communication media typically embodies computer readable instructions, data structures, program modules or other data in a modulated data signal such as a carrier wave or other transport mechanism and includes any information delivery media.

Note that the term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 230 includes computer storage media in the form of volatile and/or nonvolatile memory such as read only memory (ROM) 231 and random access memory (RAM) 232. A basic input/output system 233 (BIOS), containing the basic routines that help to transfer information between elements within the computer 210, such as during start-up, is typically stored in ROM 231. RAM 232 typically contains data and/or program modules that are immediately accessible to and/or presently being operated on by processing unit 220. By way of example, and not limitation, FIG. 2 illustrates operating system 234, application programs 235, other program modules 236, and program data 237.

The computer 210 may also include other removable/non-removable, volatile/nonvolatile computer storage media. By way of example only, FIG. 2 illustrates a hard disk drive 241 that reads from or writes to non-removable, nonvolatile magnetic media, a magnetic disk drive 251 that reads from or writes to a removable, nonvolatile magnetic disk 252, and an optical disk drive 255 that reads from or writes to a removable, nonvolatile optical disk 256 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 241 is typically connected to the system bus 221 through a non-removable memory interface such as interface 240, and magnetic disk drive 251 and optical disk drive 255 are typically connected to the system bus 221 by a removable memory interface, such as interface 250.

The drives and their associated computer storage media discussed above and illustrated in FIG. 2, provide storage of computer readable instructions, data structures, program modules and other data for the computer 210. In FIG. 2, for example, hard disk drive 241 is illustrated as storing operating system 244, application programs 245, other program modules 246, and program data 247. Note that these components can either be the same as or different from operating system 234, application programs 235, other program modules 236, and program data 237. Operating system 244, application programs 245, other program modules 246, and program data 247 are given different numbers here to illustrate that, at a minimum, they are different copies. A user may enter commands and information into the computer 210 through input devices such as a keyboard 262 and pointing device 261, commonly referred to as a mouse, trackball or touch pad.

Other input devices (not shown) may include a microphone, joystick, game pad, satellite dish, scanner, radio receiver, or a television or broadcast video receiver, or the like. These and other input devices are often connected to the processing unit 220 through a user input interface 260 that is coupled to the system bus 221, but may be connected by other interface and bus structures, such as, for example, a parallel port, game port or a universal serial bus (USB). A monitor 291 or other type of display device is also connected to the system bus 221 via an interface, such as a video interface 290. In addition to the monitor, computers may also include other peripheral output devices such as speakers 297 and printer 296, which may be connected through an output peripheral interface 295.

The computer 210 may operate in a networked environment using logical connections to one or more remote computers, such as a remote computer 280. The remote computer 280 may be a personal computer, a server, a router, a network PC, a peer device or other common network node, and typically includes many or all of the elements described above relative to the computer 210, although only a memory storage device 281 has been illustrated in FIG. 2. The logical connections depicted in FIG. 2 include a local area network (LAN) 271 and a wide area network (WAN) 273, but may also include other networks. Such networking environments are commonplace in offices, enterprise-wide computer networks, intranets and the Internet.

When used in a LAN networking environment, the computer 210 is connected to the LAN 271 through a network interface or adapter 270. When used in a WAN networking environment, the computer 210 typically includes a modem 272 or other means for establishing communications over the WAN 273, such as the Internet. The modem 272, which may be internal or external, may be connected to the system bus 221 via the user input interface 260, or other appropriate mechanism. In a networked environment, program modules depicted relative to the computer 210, or portions thereof, may be stored in the remote memory storage device. By way of example, and not limitation, FIG. 2 illustrates remote application programs 285 as residing on memory device 281. It will be appreciated that the network connections shown are exemplary and other means of establishing a communications link between the computers may be used.

IV. Operational Overview

Figure 3:
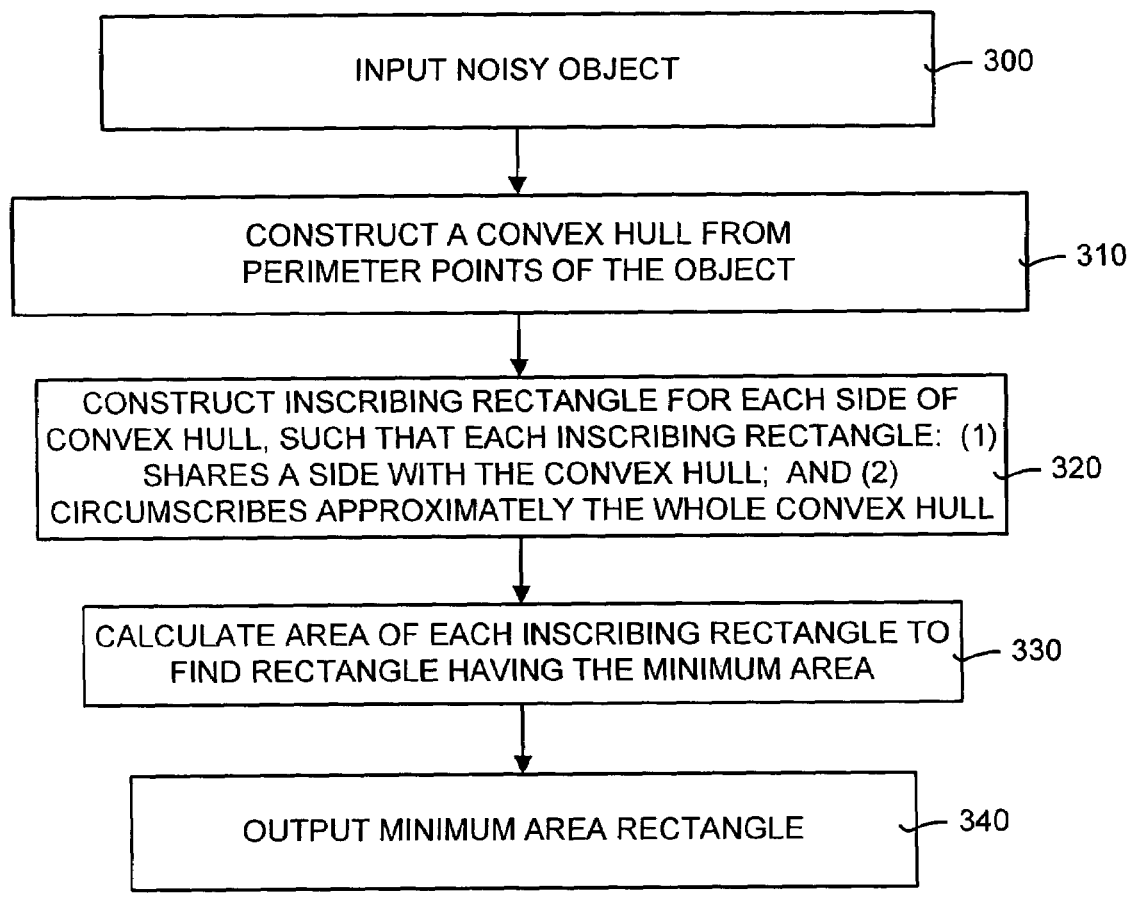
FIG. 3 is a general flow diagram illustrating the general operation of the minimum area rectangle inscription method of the minimum area rectangle inscription system shown in FIG. 1.

The minimum area rectangle inscription system 170 disclosed herein uses the minimum area rectangle inscription method to provide accurate, efficient and robust generation of bounding rectangles for objects in scanned image data. FIG. 3 is a general flow diagram illustrating the general operation of the minimum area rectangle inscription method of the minimum area rectangle inscription system 170 shown in FIG. 1. The method begins by inputting at least one noisy object (box 300). A noisy object is an object that is deformed such that it is no longer perfectly rectangular and lack well-defined edges and corners. This includes objects that are crumpled, torn, folded, creased or otherwise deformed.

Next, a convex hull is constructed from perimeter points of the object (box 310). The perimeter points are points that are located on the perimeter or boundary line of the object. Finding the perimeter points is discussed in detail below. A convex hull then is formed from the perimeter points by connecting some or all of the perimeter points, as detailed below. A convex hull is well known to those having ordinary skill in the art. A convex hull can be defined as the shortest path surrounding a given set of points. A more specific definition is given a set of points, S, a convex hull is the minimum number of points in S that generates a convex polygon containing all of the points in S.

The method then constructs inscribing rectangles for each side of the convex hull (box 320). Each inscribing rectangle meets two criteria: (a) the inscribing rectangle shares a side with the convex hull; and (b) the inscribing rectangle encompasses or circumscribes the entire convex hull. The convex hull will have a certain number of sides, which may be less than or equal to the number of perimeter points. For each of these sides, an inscribing rectangle is constructed. As will be shown in detail below, there are situations where the number of inscribing rectangles created will be less that the number of perimeter points.

For each inscribing rectangle an area then is calculated (box 330). The areas then are compared to find the inscribing rectangle having the minimum area. This is the minimum area rectangle that inscribes the object. In other words, this minimum area rectangle bounds or circumscribes approximately the entire object while still having the least amount of area of all the inscribing rectangles. The minimum area rectangle then is output (box 340). The output can be used by applications needing to know the bounding rectangles for each object, such as the object detection and extraction system 110 shown in FIG. 1.

V. Operational Details

Figure 4:
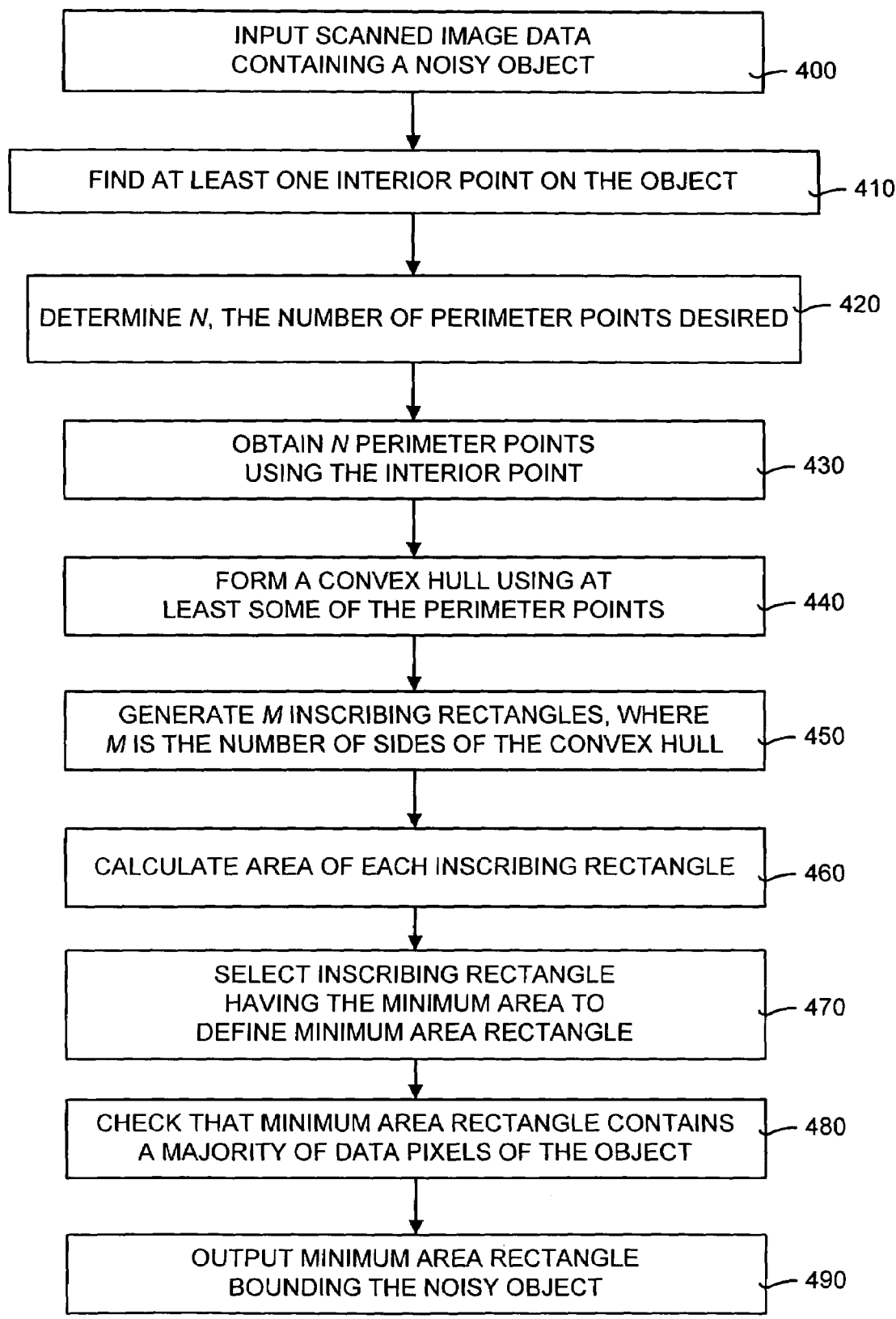
FIG. 4 is a detailed flow diagram illustrating in further detail the operation of the minimum area rectangle inscription method shown in FIG. 3.

A more detailed description of the method described above will now be presented. FIG. 4 is a detailed flow diagram illustrating in further detail the operation of the minimum area rectangle inscription method shown in FIG. 3. The method by inputting scanned image data containing at least one noisy object (box 400). Next, at least one interior point on the object is found (box 410). An interior point can be found in a variety of ways. One way is to obtain the center of mass of the object. Another way is to find the boundary of the object and work toward the interior of the object. Moreover, as described below, more that one interior point may be found and used. Once at least one interior point is found, the number of perimeter points desired (N) is determined (box 420). In a tested embodiment, N=128 gave good results. A constraint on determining N is that N should be large enough so that there is at least one perimeter point on each side of the object. However, a plurality of perimeter points on each side of the object is desirable. It should be noted that in the working example given below, N=8 is used for simplicity in describing the minimum area rectangle inscription method.

Once N is decided, the method obtains N perimeter points using the interior point (box 430). One way to find the perimeter points is to generate an orthogonal coordinate system centered at the interior point. Next, a ray is sent out from the interior point to the perimeter or boundary of the object. When N=8, the rays can be send out in the cardinal compass directions, in other words, North, Northeast, East, Southeast, South, Southwest, West, and Northwest. For each perimeter point, send out a ray from the interior point along the N directions until the perimeter of the object is reached. At this point, a perimeter point is defined at the boundary of the object along the cardinal compass directions.

In mathematical terms, the perimeter points are found as follows. For each angle, $\theta(i)=2\pi i/N$, for $i=0, 1, 2, \ldots N-1$ send a ray from the interior point until reaching the perimeter of the object. It should be noted that the cardinal compass points do not have to be used. In fact, the coordinate system does not need to be orthogonal, and could be at any angle. Moreover, the spacing between the rays being sent out from the interior point does not need to be evenly spaced. In other words, rays can be randomly spaced.

Once the perimeter points have been found, a convex hull is formed using at least some of the perimeter points (box 440). Generally, this means joining each of the perimeter points. However, it must be remembered that by definition a convex hull cannot have concave sides. Therefore, if using a certain perimeter point will generate a concave side, then that particular perimeter point is not used. In other words, any perimeter points that make the convex hull indent in are ignored. It can generally be stated that the number of sides the convex hull contains (M) will be equal to or less than the number of perimeter points, N, or M≦N.

Next, M number of inscribing rectangles are generated (box 450). As noted above, M is the number of sides of the convex hull. A side is defined as a line segment between two perimeter points lying on the perimeter of the convex hull. Each of the inscribing rectangles must meet the following two criteria: (1) the inscribing rectangle must share an edge with the convex hull. In other words, at least one side of the inscribing rectangle also has to must be a side of the convex hull; and (2) the inscribing rectangle has to cover approximately the whole of the convex hull. In other words, substantially all of the convex hull is contained in the inscribing rectangle. Each of the M inscribing rectangles generated must meet these two criteria.

The area of each of the M inscribing rectangles then is calculated (box 460). The inscribing rectangle having the minimum area is defined as the minimum area rectangle (box 470). The minimum area rectangle is the inscribing rectangle than encapsulates or circumscribes approximately all of the image data of the object. Since the object is typically noisy, and by definition not a perfect rectangle, some background pixels often will be included in the minimum area rectangle. What the minimum area rectangle represents is the smallest rectangle that maximizes the number of image data pixels in the object (i.e., contains approximately all of the image data in the object) and minimizes the number of background pixels. Rectangles are used because image data typically is stored as columns and rows. In addition, image processing software is designed to handle images that are arranged in a rectangular fashion.

In order to ensure accuracy, a check can be performed to ensure that the minimum area rectangle actually does contain a majority of image data pixels of the object (box 480). This is an optional process. Once the minimum area rectangle is found and checked for accuracy, it is sent as output (box 490).

VI. Working Examples

In order to more fully understand the minimum area rectangle inscription system and method disclosed herein, the operational details of two exemplary working examples are presented. It should be noted that these working examples are only two ways in which the minimum area rectangle inscription system and method may be implemented.

First Working Example

Figure 5A:
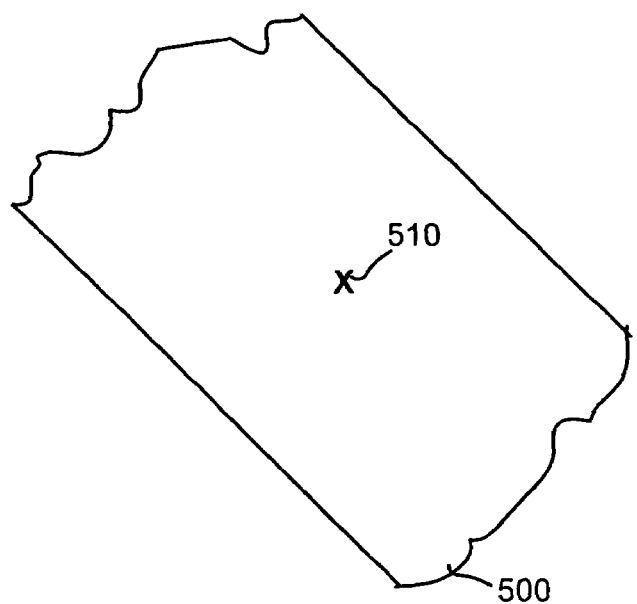
FIG. 5A illustrates a first object that is not perfectly rectangular that is used in a first working example.

FIGS. 5A-5H illustrates a first working example using the minimum area rectangle inscription method shown in FIGS. 3 and 4. FIG. 5A illustrates a first object 500 that is not perfectly rectangular that is used in this first working example. It should be noted that for the sake of simplicity only a single object is shown. Moreover, the remainder of the scanned image data is not shown. However, it should be realized that the first object 500 is contained in scanned image data. Moreover, the first object may be one of several objects contained in the scanned image data.

Initially, a first interior point 510 is found within the first object 500. Any number of interior points may be used, but for simplicity, only a single interior point is shown and used in this first working example. As noted above, the first interior point may be found using a variety of techniques. In this first working example, the centroid or center of mass of the first object 500 was found to determine the first interior point 510.

Figure 5B:
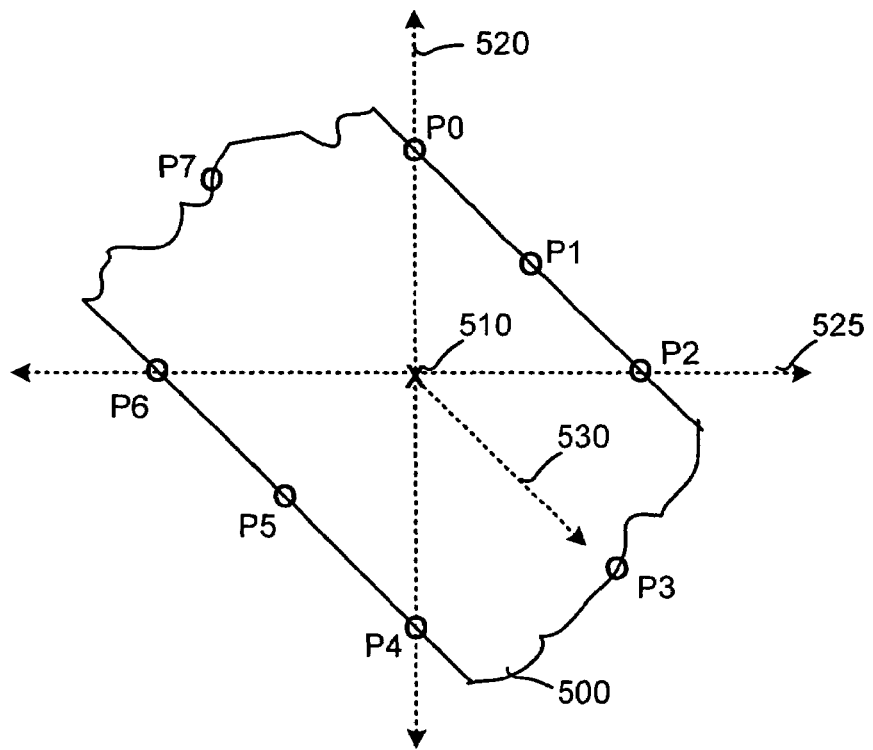
FIG. 5B illustrates finding the perimeter points for the first object using the first interior point.

FIG. 5B illustrates finding the perimeter points for the first object 500 using the first interior point 510. In particular, in this first working example an orthogonal coordinate system was established. This coordinate system contained a first vertical (or the "X") axis 520 and a first horizontal (or the "Y")axis 525. The number of perimeter points, N, then is selected. In this first working example, N=8. Thus, 8 perimeter points are defined on the first object 500. In this first working example, the perimeter points are on the cardinal compass points, although this is not a requirement. A ray 530 is sent out from the first interior point 510 to the perimeter of the first object 500. Where the ray 530 intersects with the perimeter of the first object 500, a perimeter point is defined. In FIG. 5B, the ray 530 is shown being sent out from the first interior point 510 toward perimeter point P3. The process of finding the perimeter points is repeated for each of the N perimeter points. In FIG. 5B, the eight perimeter points are P0, P1, P2, P3, P4, P5, P6 and P7.

Figure 5C:
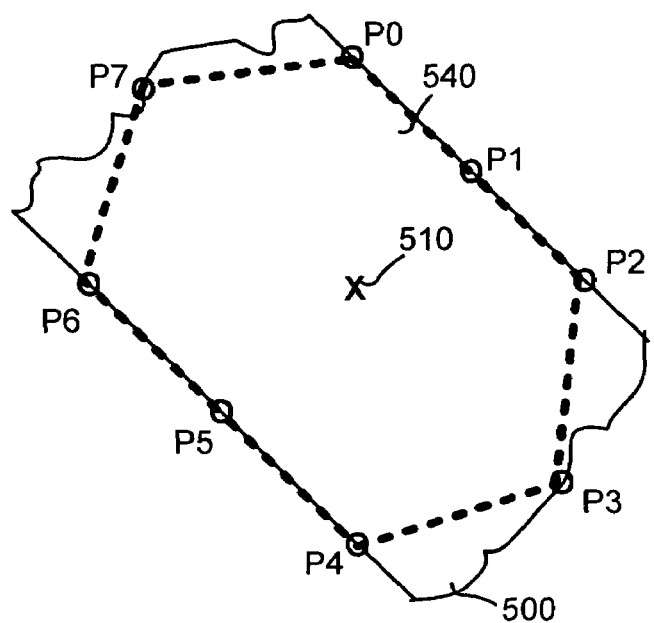
FIG. 5C illustrates the convex hull of the first object.

FIG. 5C illustrates the convex hull 540 of the first object 500. The convex hull 540 is shown outlined in FIG. 5C with a heavy, dashed line. The convex hull 540 is generated by drawing line segments from P0 to P1, P1 to P2, and so forth, to connect the perimeter points. Note that the convex hull 540 circumscribes a majority of the first object 500, but is still missing some portions of the first object 500.

In this first working example, each of the eight perimeter points P0 to P7 is used in the generation of the convex hull 540. Thus, the convex hull 540 contains eight sides. As shown in FIG. 5C, all the perimeter points are used because none of the line segments creates a concave or inward indented side for the convex hull 540. In the next working example given below, an example is given where some of the perimeter points are not used.

Figure 5D:
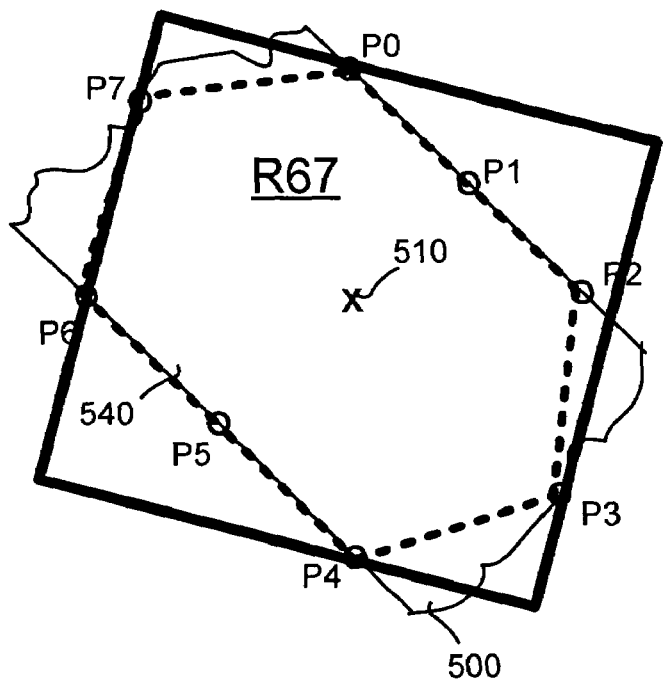
FIG. 5D illustrates the construction of inscribing rectangle R67 for the convex hull.

FIG. 5D illustrates the construction of inscribing rectangle R67 for the convex hull 540. As used in this document, the convention R67 for an inscribing rectangle means that the rectangle shares a side with the convex hull 540, where the side shared is defined by a line segment going from P6 to P7. When generating an inscribing rectangle, two criteria must be met. First, the inscribing rectangle must share as least one side or edge with the convex hull 540. In FIG. 5D, the shared side is P6-P7, thus, the inscribing rectangle is called R67. Second, the inscribing rectangle must cover or contain approximately the entire convex hull 540. As shown in FIG. 5D, the inscribing rectangle 67 does circumscribe approximately the entire convex hull 540.

Figure 5E:
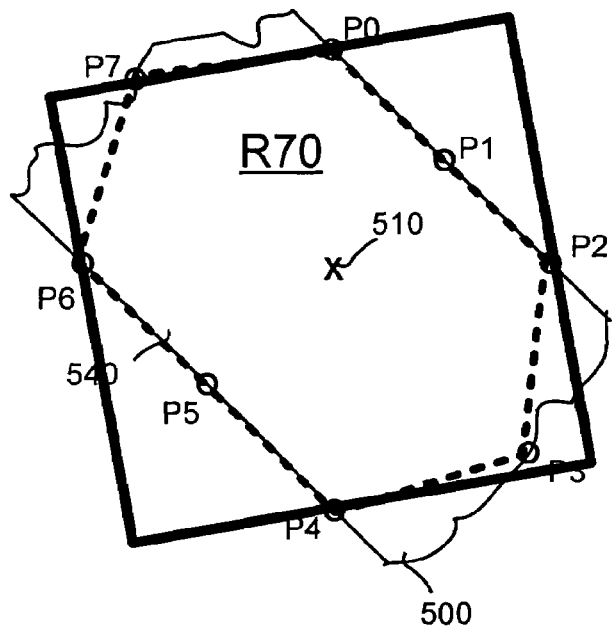
FIG. 5E illustrates the construction of inscribing rectangle R70 for the convex hull.
Figure 5F:
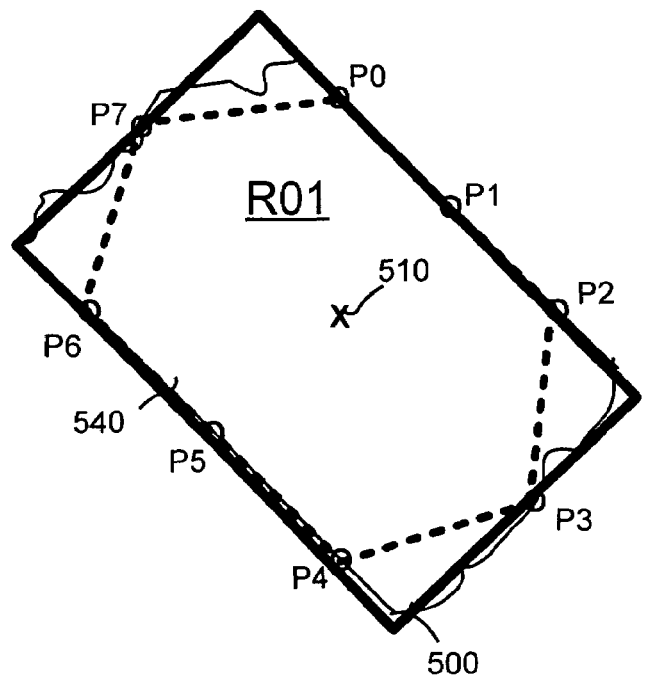
FIG. 5F illustrates the construction of inscribing rectangle R01 for the convex hull.

Inscribing rectangles are constructed for each of side of the convex hull. FIG. 5E illustrates the construction of inscribing rectangle R70 for the convex hull 540. Note that inscribing rectangle R70 shares the line segment P7 to P0 with the convex hull 540 and also circumscribes approximately the entire convex hull 540. FIG. 5F illustrates the construction of inscribing rectangle R01. Inscribing rectangle R01 shares the line segment P0 to P1 with the convex hull 540 and contains approximately all of the convex hull 540. Inscribing rectangles R12, R45 and R56 are not shown because they are substantially similar in orientation and size to inscribing rectangle R12. Thus, for the sake of simplicity, the construction of these inscribing rectangles is not illustrated.

Figure 5G:
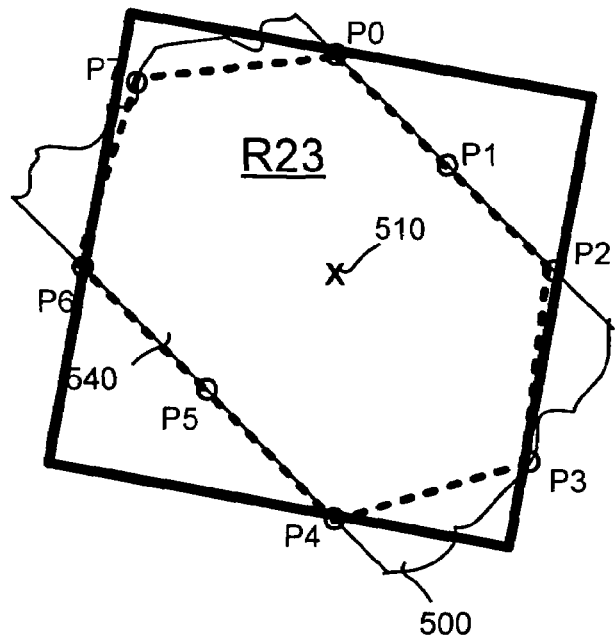
FIG. 5G illustrates the construction of inscribing rectangle R23 for the convex hull.

FIG. 5G illustrates the construction of inscribing rectangle R23. Inscribing rectangle 23 shares line segment P2-P3 with the convex hull 540 and contains substantially all of the convex hull 540. Similarly, FIG. 5H illustrates the construction of inscribing rectangle R34, which shares line segment P3-P4 with the convex hull 540 and contains approximately all of the convex hull 540 within its boundaries.

The construction of inscribing rectangles yields eight inscribing rectangles for the convex hull 540. Namely, R01, R12, R23, R34, R45, R56, R67, and R70 are the eight inscribing rectangles. Each of the inscribing rectangles shares at least one side with the convex hull 540 and covers approximately the entire convex hull 540. In addition, each of the inscribing rectangles has an area. The goal is to find the one inscribing rectangle having the minimum area. Referring to FIG. 5D, it can be seen that inscribing rectangle R67 is not the minimum area rectangle. This can be seen from FIG. 5D because R67 is skewed with respect to the first object 500. In addition, R67 misses whole corners of the first object 500 and includes a great deal of background data that are not part of the first object 500.

Figure 5H:
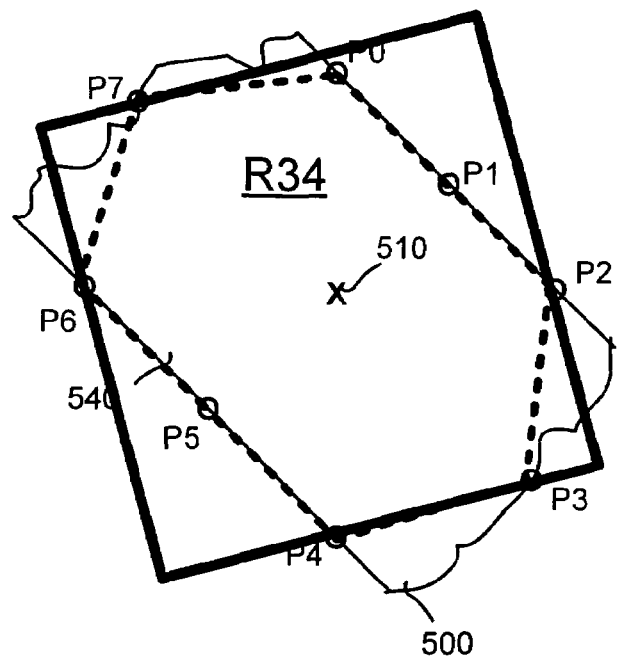
FIG. 5H illustrates the construction of inscribing rectangle R34 for the convex hull.

Referring to FIGS. 5E, 5G and 5H, it can be seen that inscribing rectangles R70, R23 and R34 also are not the minimum area rectangles, for the reasons given above. However, referring to FIG. 5F, it can be seen that inscribing rectangle R01 is the minimum area rectangle. R01 is aligned with the first object 500, contains a substantial amount of the image data of the first object 500, and does not contain a great deal of background data.

It should be noted that inscribing rectangles R12, R45 and R56, which are not shown, will have an area similar to R01. Sometimes the area of inscribing rectangles will be similar. Typically, however, one of the inscribing rectangles will have the absolute least area, even if by only a small amount.

Finding Inscribing Rectangles

The details of how the inscribing rectangles in the first working example were constructed and the area computer will now be discussed. FIGS. 6A-6F illustrate how the inscribing rectangle R01 (shown in FIG. 5F) was constructed. In general, the process for finding inscribing rectangles includes: (1) choosing a line segment that is a side of convex hull; (2) defining that line segment or side as the x-axis; (3) finding a vertex of the convex hull that has a maximum x value (find $x_{max}$); (4) finding a vertex of the convex hull that has a maximum x value (find $x_{min}$); (5) finding a vertex of the convex hull that has a maximum y value (find $y_{max}$); (6) finding a vertex of the convex hull that has a minimum y value (find $y_{min}$); and (7) computing area of inscribing rectangle using the formula:

$$\text{Area}=|(x_{max}-x_{min})\cdot(y_{max}-y_{min})| \quad (1).$$

Figure 6A:
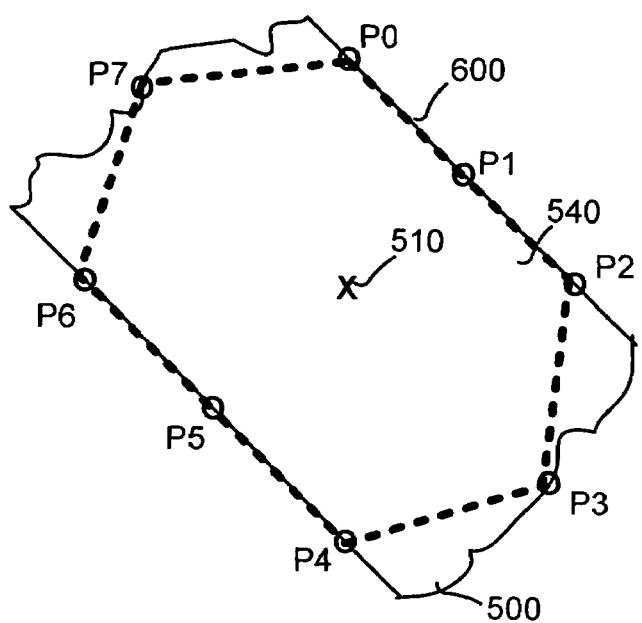
FIG. 6A illustrates the first object with its accompanying convex hull.

The above process for finding an inscribing rectangle will now be discussed as it applies to finding the inscribing rectangle R01 shown in FIG. 5F. FIG. 6A illustrates the first object 500 with its accompanying convex hull 540. First, one side of the convex hull 540 is selected. In this example, the side of the convex hull represented by the line segment 600 from P0 to P1 was selected.

Figure 6B:
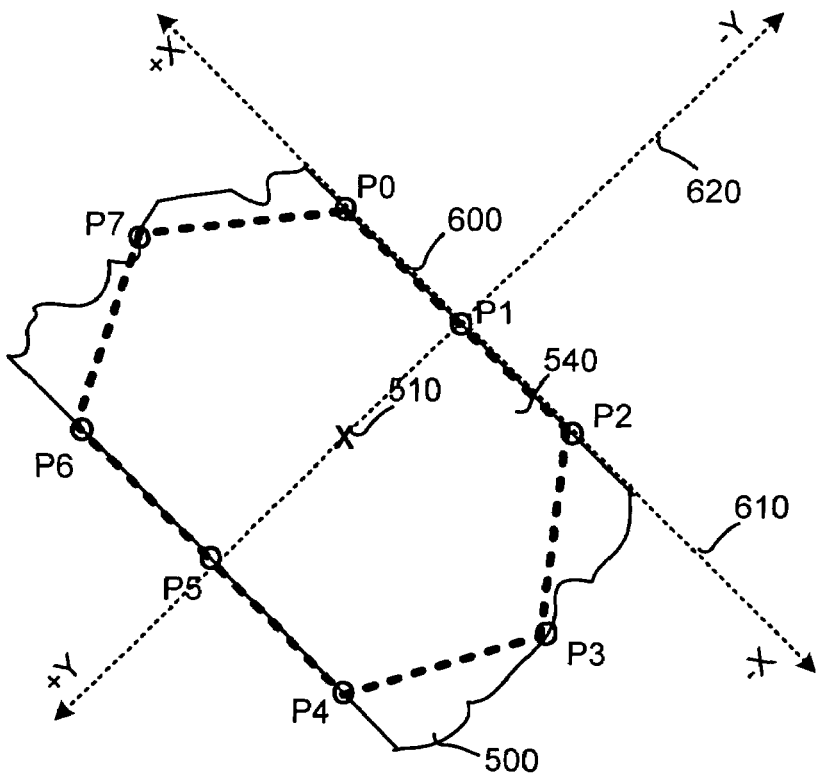
FIG. 6B illustrates applying a coordinate system to the convex hull.
Figure 6C:
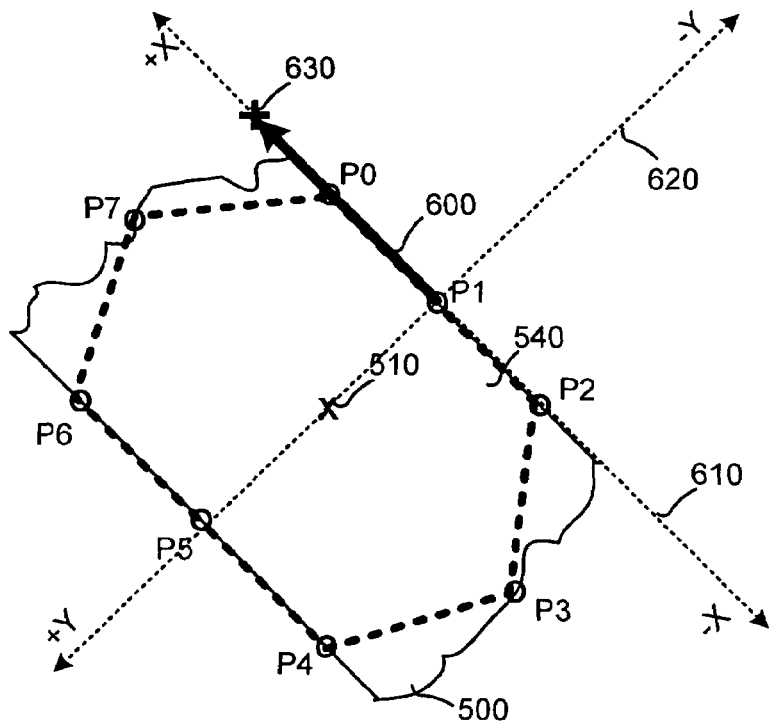
FIG. 6C illustrates finding the maximum x component of the inscribing rectangle R01.

FIG. 6B illustrates applying a coordinate system to the convex hull 540. In particular, the x-axis 610 is applied such that the axis is parallel to the line segment P0-P1 600. The y-axis is located such that the y-axis 620 is orthogonal to the x-axis 610. FIG. 6C illustrates finding the maximum x component of the inscribing rectangle R01. In particular, find the vertex of the convex hull 540 in the positive x direction having the maximum value (i.e., $x_{max}$). The scan outward from the origin along the positive x-axis is shown as a heavy, solid line having an arrow. As shown in FIG. 6C, $x_{max}$ 630 is located at the x value of P7.

Figure 6D:
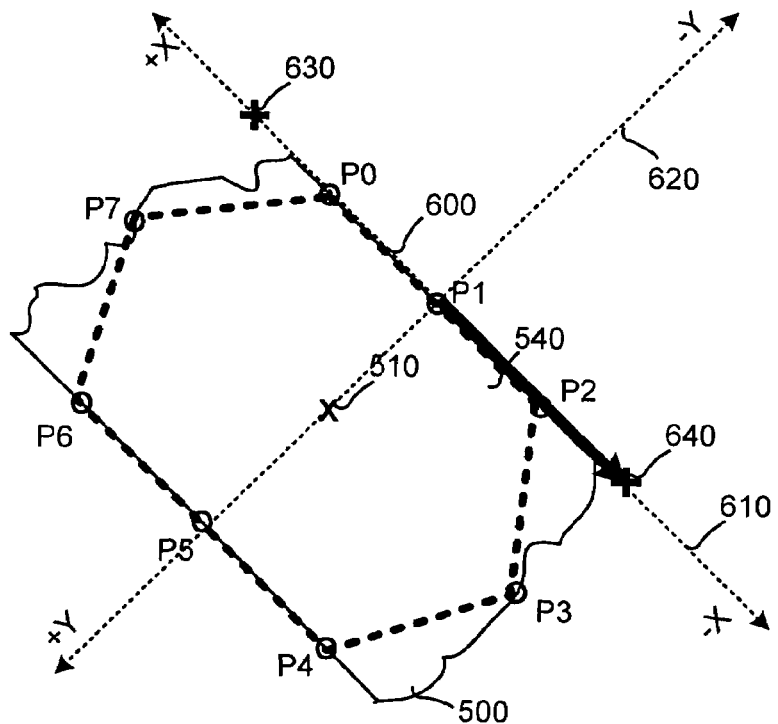
FIG. 6D illustrates finding the minimum x component of the inscribing rectangle R01.
Figure 6E:
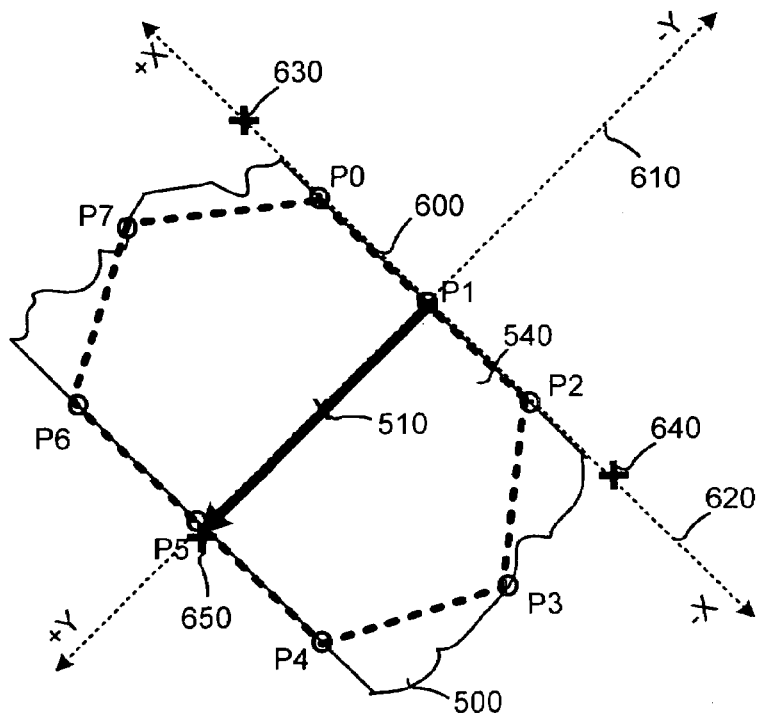
FIG. 6E illustrates finding the maximum y component of the inscribing rectangle R01.

FIG. 6D illustrates finding the minimum x component of the inscribing rectangle R01. As shown by the heavy, solid line, the vertex of the convex hull 540 having the minimum x value is found (i.e., $x_{min}$). As shown in FIG. 6D, $x_{min}$ 640 is located at the x value of P3. FIG. 6E illustrates finding the maximum y component of the inscribing rectangle R01. As shown by the heavy, solid line in FIG. 6E, a scan is made outward from the origin in the positive y direction until the vertex of having a maximum y value is found (i.e., $y_{max}$). The value $y_{max}$ 650 is located at the y value of P5. It should be noted that the axes were arranged so that the origin was at P1. Alternatively, the axes can be set up differently such that a minimum y value also needs to be found.

Figure 6F:
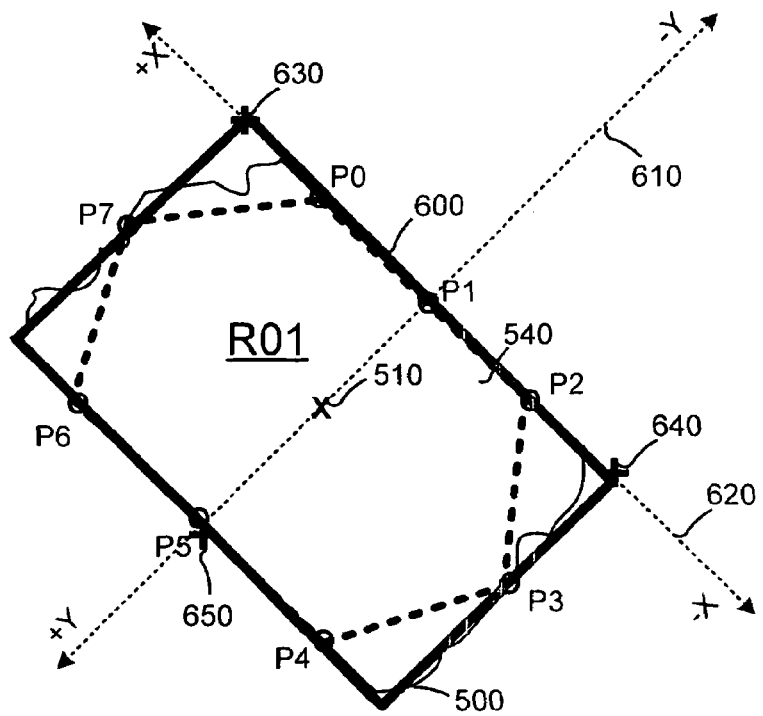
FIG. 6F illustrates the finished inscribing rectangle R01.

FIG. 6F illustrates the finished inscribing rectangle R01. The area of the rectangle easily can be determined by using equation (1) given above. In the case of the first working example, R01 is also the minimum area rectangle for the convex hull 540.

Second Working Example

FIGS. 7A-7I illustrate a second working example using the minimum area rectangle inscription method shown in FIGS. 3 and 4. In this second working example, not all of the perimeter points are used to construct a convex hull, since one of the perimeter points causes a concave side. This is described in greater detail below.

Figure 7A:
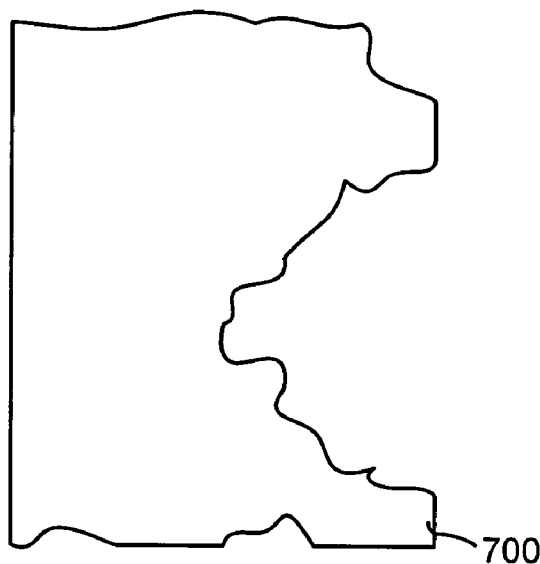
FIG. 7A illustrates a second object that is not perfectly rectangular used in a second working example.

FIG. 7A illustrates a second object 700 that is not perfectly rectangular (i.e., a noisy object) used in this second working example. Again, for the sake of simplicity, only a single object is shown, and the remainder of the scanned image data is not shown.

Figure 7B:
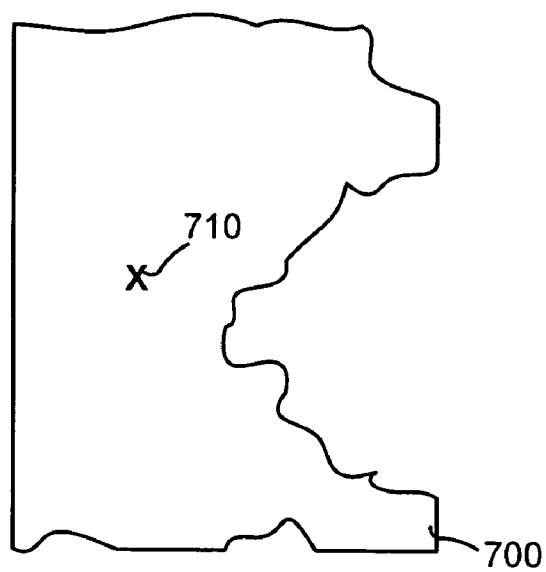
FIG. 7B illustrates selecting a second interior point within the second object.

FIG. 7B illustrates selecting a second interior point 710 within the second object 700. Any number of interior points may be used, but in this second working example, only a single interior point was used. The second interior point 710 was found by calculating the center of mass of the second object 700. Alternatively, any number of existing methods could be used to find a point that is located within the second object 700. In addition, an interior point can be selected manually by a user.

Once the second interior point 710 has been selected, the number of perimeter points desired is determined and the perimeter points are located. In this second working example, the number of perimeter points, N, was set equal to 8 (N=8). However, as noted above, other numbers may be used, with the only constraint being that it is desirable to have at least one perimeter point for each side of the object.

Figure 7C:
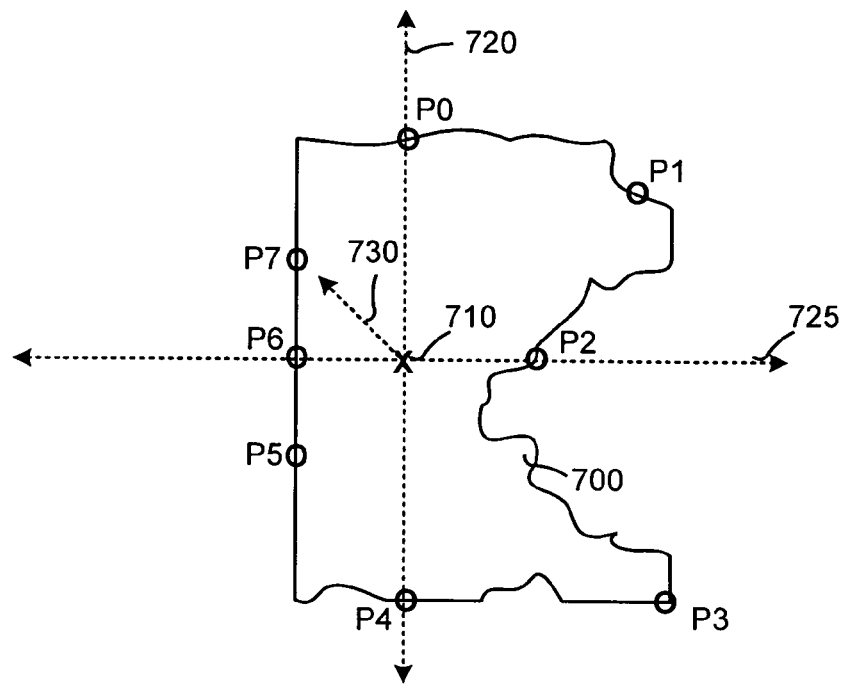
FIG. 7C illustrates finding the perimeter points for the second object using the second interior point.

FIG. 7C illustrates finding the perimeter points for the second object using the second interior point. An orthogonal coordinate system was established which, similar to the first working example, contained a second vertical (or the "X") axis 720 and a second horizontal (or the "Y")axis 725. The perimeter points are on the cardinal compass points. Each of the perimeter points was found by sending a ray 730 outward in some direction starting from the second interior point 710 to the perimeter of the second object 700. Where the ray 730 intersects with the perimeter of the second object 700, a perimeter point is defined. In FIG. 7C, the ray 730 is shown being sent out from the second interior point 710 toward perimeter point P7. The direction in which the ray 730 is being sent is the northwest direction, which bisects the upper left quadrant created by the X and Y axes. The process of finding the perimeter points is repeated for each of the N perimeter points. In FIG. 7C, the eight perimeter points are P0, P1, P2, P3, P4, P5, P6 and P7.

Figure 7D:
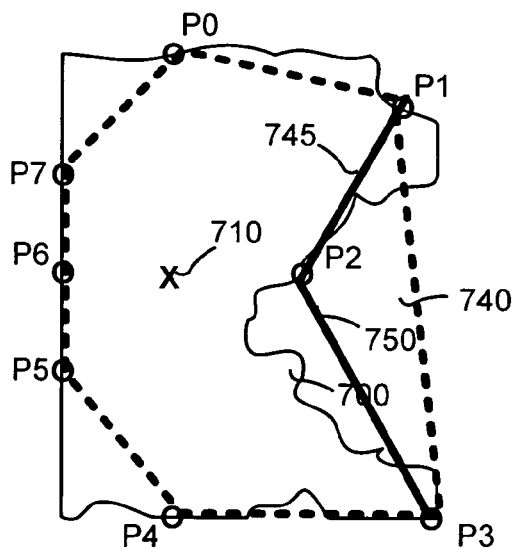
FIG. 7D illustrates a convex hull of the second object.

FIG. 7D illustrates a convex hull 740 of the second object 700. The convex hull 740 is shown in FIG. 7D outline with a heavy, dashed line. The convex hull 740 is generated by connecting the perimeter points. However, note that connecting perimeter points P1 and P2 results in an indentation or concavity in the convex hull 740. The P1-P2 line segment 745 (shown in FIG. 7D by a heavy solid line) violates the definition of a convex hull. Similarly, connecting perimeter points P2 and P3 results in a concavity of the convex hull 740. In addition, the P2-P3 line segment 750 (also shown in FIG. 7D by a heavy solid line) violates the definition of a convex hull.

In order to avoid this concavity, lines segments P1-P2 745 and P2-P3 750 are not used. This means that one side of the convex hull 740 is made by drawing a line segment from P1 directly to P3, and bypassing P2. Thus, the convex hull 740 uses perimeter points P0, P1, P3, P4, P5, P6 and P7. Accordingly, the convex hull 740 only contains seven sides, which is less than the eight perimeter points.

Figure 7E:
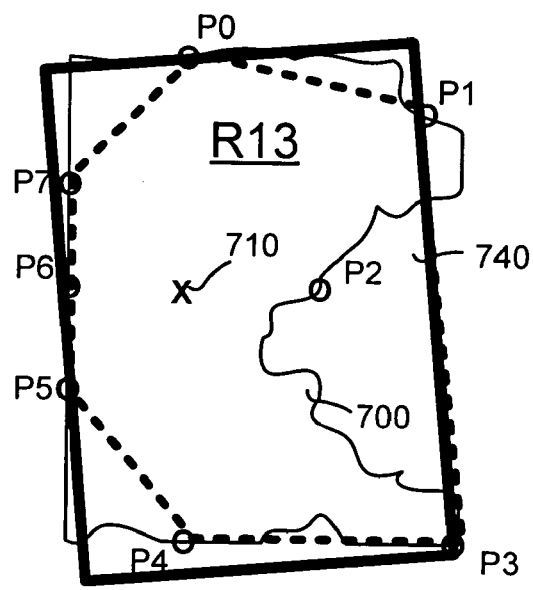
FIG. 7E illustrates the construction of inscribing rectangle R13 for the convex hull.
Figure 7F:
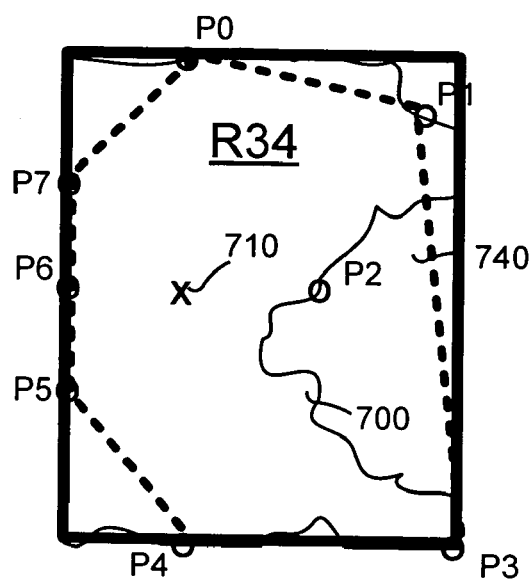
FIG. 7F illustrates the construction of inscribing rectangle R34.

FIG. 7E illustrates the construction of inscribing rectangle R13 for the convex hull 740. Each of the seven inscribing rectangles constructed in this second working example share at least one side with the convex hull 740 and contains the entire convex hull 740. In FIG. 7E, the inscribing rectangle R13 shares a side (or line segment) P1-P3 with the convex hull 740. Note that R14 circumscribes a substantial amount of the second object 700 while minimizing the background data contained therein. FIG. 7F illustrates the construction of inscribing rectangle R34. Note that R34 contains a slightly larger amount of background data, as compared to R13 in FIG. 7E. In addition, it can be seen from FIG. 7F that R34 is similar to R56 and R67. For this reason, and to simplify the description, R56 and R67 are not illustrated.

Figure 7G:
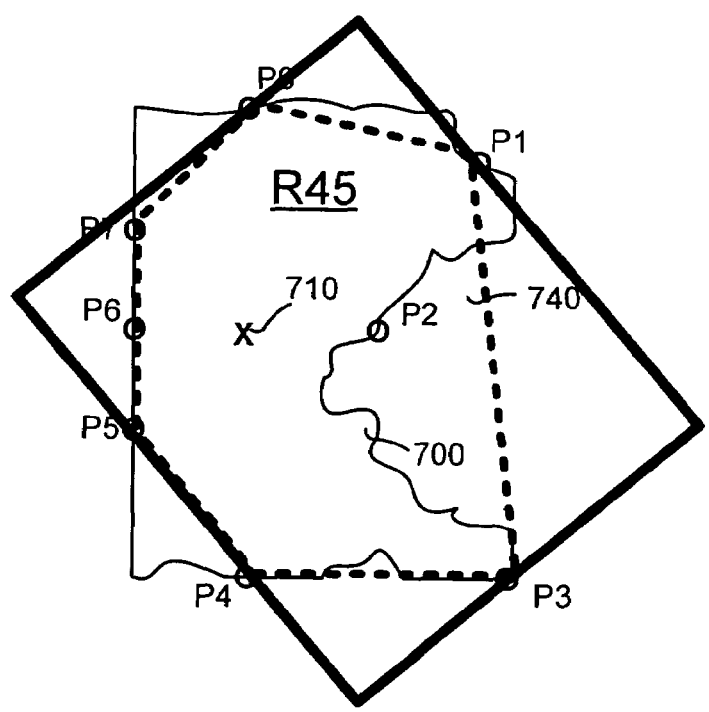
FIG. 7G illustrates the construction of inscribing rectangle R45.
Figure 7H:
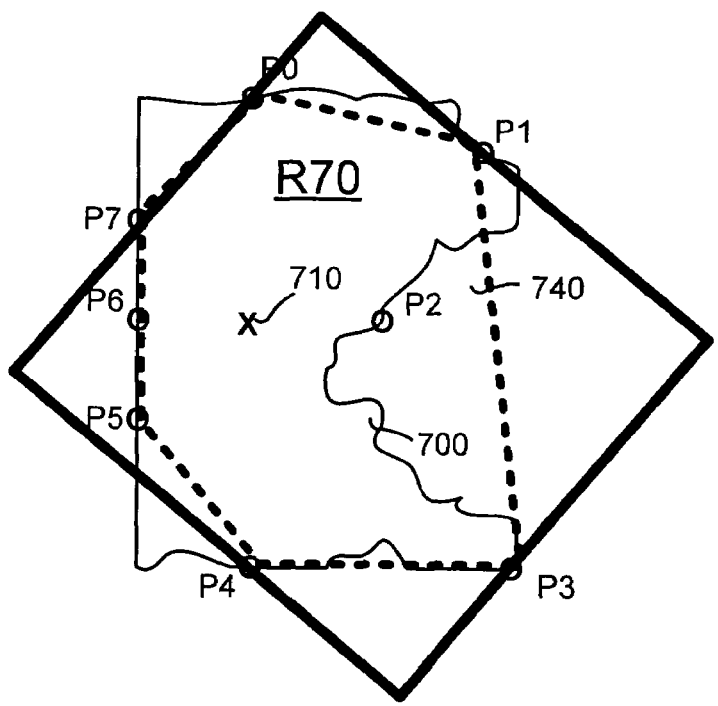
FIG. 7H illustrates the construction of inscribing rectangle R45.
Figure 7I:
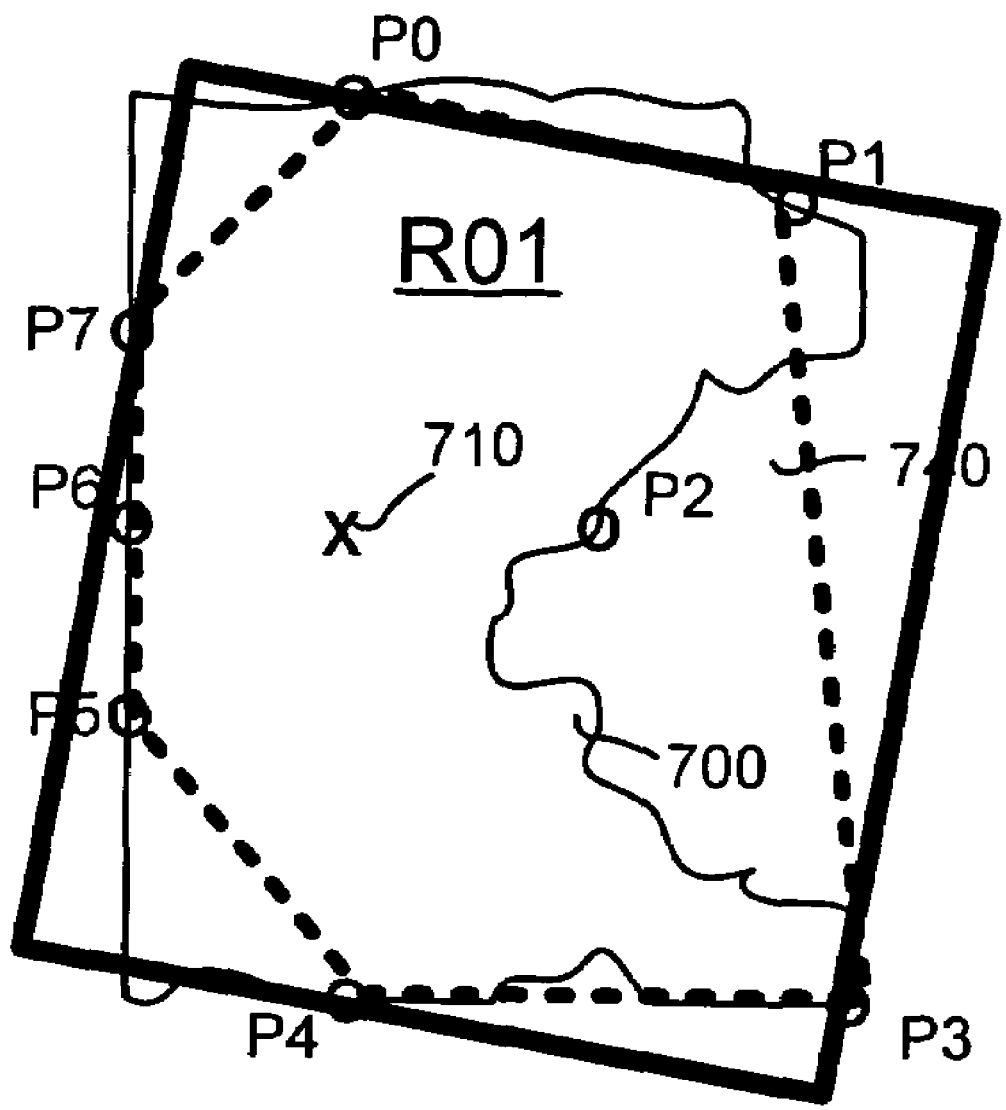
FIG. 7I illustrates the construction of inscribing rectangle R01.

FIG. 7G illustrates the construction of inscribing rectangle R45. Note that R45 is skewed with the second object 700 and contains less image data and more background data than R13 and R34. FIG. 7H illustrates the construction of inscribing rectangle R45. R45 contains an even greater amount of background data and even less image data than the previous inscribing rectangles. FIG. 7I illustrates the construction of inscribing rectangle R01. R01 is somewhere in the middle of the other inscribing rectangles, containing more background data that R13 and R34 but less background data than R45 and R70.

Next, the area of each of the inscribing rectangles was constructed. The inscribing rectangle having the minimum area was R13, shown in FIG. 7E. Rectangles R56 and R67, which were not illustrated, also had an area similar to R13. Referring to FIGS. 7F, 7G, 7H and 7I, it can be seen that inscribing rectangles R34, R45, R70 and R01 are not the minimum area rectangles. This is because these rectangles were skewed with respect to the second object 700, contained too much background data and too little image data, or both. R13 was the rectangle that had the least amount of area, was aligned with the second object 700, and contained a substantial amount of the image data of the second object 700 without containing a great deal of background data.

Alternate Embodiments

Several alternate embodiments may be used to verify the accuracy of the minimum area rectangle obtained or to be used in a specific situation. In one alternate embodiment, one or more interior points are picked randomly, and still located within the boundaries of the object. These interior points do not necessarily have to be at or near the center or center of mass of the object. The minimum area rectangle inscription method and system is so robust that it will still converge to the correct minimum area rectangle even with randomly chosen interior points.

In another alternate embodiment, a plurality of minimum area rectangles are constructed, based on different interior points, and compared to each other. This embodiment can be used as an error check to ensure that the correct minimum area rectangle is obtained. If the areas of the minimum area rectangles obtained using different interior points are similar to each other, then it can be said with some certainty that the correct minimum area rectangle was obtained. Otherwise, there may be an error may have been made in calculating the rectangles. This additional processing can be performed at a nominal additional cost because the processing cost for the minimum area rectangle inscription method and system is so inexpensive.

In this alternate embodiment, a plurality of interior points is selected. Perimeter points are determined for each of the interior points, and corresponding convex hulls are constructed. Moreover, a minimum area rectangle is obtained for each of the convex hulls, such that a plurality of minimum area rectangles are constructed, one for each convex hull. Each of the plurality of minimum area rectangles then are compared to each other, and the rectangle having the least area from these is selected.

Another alternate embodiment uses a plurality of interior points to find a single convex hull. This embodiment is useful when the object has a large part of the interior missing, such as might happen if a right-hand side of a receipt is torn near the center of the receipt. The top and bottom of the receipt are not deformed, but their is a large part missing in the center of the receipt. In this case, finding a single interior point at the center of mass will yield a convex hull that is missing a large portion of the object. By using multiple interior points and obtaining perimeter points based on these interior points, a single convex hull can be constructed that will capture more of the object.

Specifically, this embodiment first selects multiple interior points. Next, perimeter points are found for each of the interior points. This yields a number of perimeter points based on a number of interior points. Using these perimeter points, a single convex hull is constructed. Inscribing rectangles then are constructed and the minimum area rectangle obtained.

In an alternate embodiment, the perimeter points are found by working out from the center, but allowing some background pixels to be encountered before declaring a point to be a perimeter point. In one approach, the total number of pixels that a ray at angle $\theta(i)$, starting at the chosen interior point, encounters before reaching the edge of the image examined is calculated. Suppose that d of those pixels are data pixels and b of those pixels are background pixels, so that b+d represents the total number of pixels on that ray. Then, working out from the center, the first background point encountered could declare as perimeter point such that at least a threshold percentage (e.g. 95%) of the data pixels have been encountered by the ray. Numerous variations on how the perimeter points are chosen can be employed using this technique or others known to those skilled in the art.

The foregoing description of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description of the invention, but rather by the claims appended hereto.

What is claimed is:

1. A method for automatically finding a minimum area rectangle to inscribe an object, comprising:
    using a processor to compute the following:
    inputting scanned image data containing the object that is a noisy object having a deformed rectangular shape that is not perfectly rectangular and is deformed such that it is no longer perfectly rectangular and lacks well-defined edges and corners;
    determining a number, N, of points on a perimeter or boundary line of the object that are desired;
    finding the N perimeter points by generating an orthogonal coordinate system centered at an interior point that is inside the object and sending out a ray outward from the interior point along a direction until reaching the perimeter or boundary line of the object and designating an intersection of the perimeter and ray as one of the N perimeter points and repeating this process N times in N different directions;
    constructing a convex hull from at least some of the N perimeter points located on a boundary of the object, wherein each side of the convex hull is a straight line segment between two of the perimeter points;
    constructing an inscribing rectangle at each of side of the convex hull; and
    calculating an area of each inscribing rectangle to find an inscribing rectangle having a minimum area to obtain the minimum area rectangle.

2. The method of claim 1, further comprising constructing each inscribing rectangle such that each inscribing rectangle: (a) shares at least one side with the convex hull; and (b) inscribes the convex hull.

3. The method of claim 2, wherein the object is located within scanned image data.

4. The method of claim 1, further comprising selecting a large enough value of N so that there is at least one perimeter point located on each side of the object.

5. The method of claim 1, further comprising finding the center of mass of the object and defining the center of mass as the interior point.

6. The method of claim 1, further comprising randomly selecting the interior point.

7. The method of claim 1, further comprising having N evenly-spaced rays.

8. The method of claim 1, further comprising having N randomly-spaced rays.

9. The method of claim 1, further comprising having an angle between the rays given by the formula:

$$\theta(i)=2\pi i/N, \text{ for } i=0, 1, 2, \ldots N-1$$

wherein $\theta(i)$ is the angle and N is the number of perimeter points.

10. The method of claim 1, further comprising selecting a plurality of interior points that are located inside the boundary of the object.

11. The method of claim 10, wherein at least some of the plurality of interior points are selected randomly.

12. The method of claim 10, further comprising determining the perimeter points for each of the plurality of interior points.

13. The method of claim 12, further comprising constructing a convex hull for each of the plurality of interior points using the perimeter points corresponding to each of the plurality of interior points by connecting some or all of the perimeter points using with straight lines.

14. The method of claim 13, further comprising:
    obtaining a minimum area rectangle for each of the convex hulls; and
    comparing the minimum area rectangles and selecting one of the minimum area rectangles having a minimum area.

15. The method of claim 12, further comprising constructing a single convex hull using the perimeter points obtained from the plurality of interior points.

16. The method of claim 15, further comprising obtaining the minimum area rectangle using the convex hull.

17. The method of claim 1, wherein constructing the convex hull further comprises drawing line segments between at least some of the perimeter points to form a convex hull having M sides, wherein M is equal to the number of perimeter points used in constructing the convex hull.

18. The method of claim 17, further comprising determining M by ignoring any of the perimeter points that would cause the convex hull to become concave.

19. The method of claim 1, wherein constructing an inscribing rectangle further comprises:
    selecting a side of the convex hull, wherein the selected side is a line segment between two of the perimeter points; and
    defining a coordinate system having a first axis that is parallel to the selected side and a second axis that is perpendicular to the first axis.

20. The method of claim 19, further comprising:
    finding a first vertex of the convex hull having a maximum value on the first axis;
    finding a second vertex of the convex hull having a minimum value on the first axis;
    finding a third vertex of the convex hull having a maximum value on the second axis; and
    finding a fourth vertex of the convex hull having a minimum value on the second axis.

21. The method of claim 20, wherein calculating the area of the inscribing rectangle further comprises:
    subtracting the second vertex from the first vertex to obtain a first result;
    subtracting the fourth vertex from the third vertex to obtain a second result; and
    multiplying the first result times the second result.

22. The method of claim 1, further comprising checking that the minimum area rectangle contains a majority of the object.

23. A computer-readable storage medium having stored thereon computer-executable instructions that are executable by a general-purpose computing device for performing the steps of:
    inputting scanned image data containing the object that is a noisy object having a deformed rectangular shape that is not perfectly rectangular and is deformed such that it is no longer perfectly rectangular and lacks well-defined edges and corners;
    determining a number, N, of points on a perimeter or boundary line of the object as that are desired;
    finding the N perimeter points by generating an orthogonal coordinate system centered at an interior point that is inside the object and sending out a ray outward from the interior point along a direction until reaching the perimeter or boundary line of the object and designating an intersection of the perimeter and ray as one of the N perimeter points and repeating this process N times in N different directions;
    constructing a convex hull from at least some of the N perimeter points located on a boundary of the object, wherein each side of the convex hull is a straight line segment between two of the perimeter points;
    constructing an inscribing rectangle at each of side of the convex hull; and
    calculating an area of each inscribing rectangle to find an inscribing rectangle having a minimum area to obtain the minimum area rectangle.

* * * * *